W. ARTER.
MAGNETIC CHUCK.
APPLICATION FILED JUNE 28, 1917.

1,312,092.

Patented Aug. 5, 1919.
3 SHEETS—SHEET 1.

INVENTOR
William Arter
by McDermott and McBrady
his attorneys

W. ARTER.
MAGNETIC CHUCK.
APPLICATION FILED JUNE 28, 1917.
1,312,092.
Patented Aug. 5, 1919.
3 SHEETS—SHEET 2.
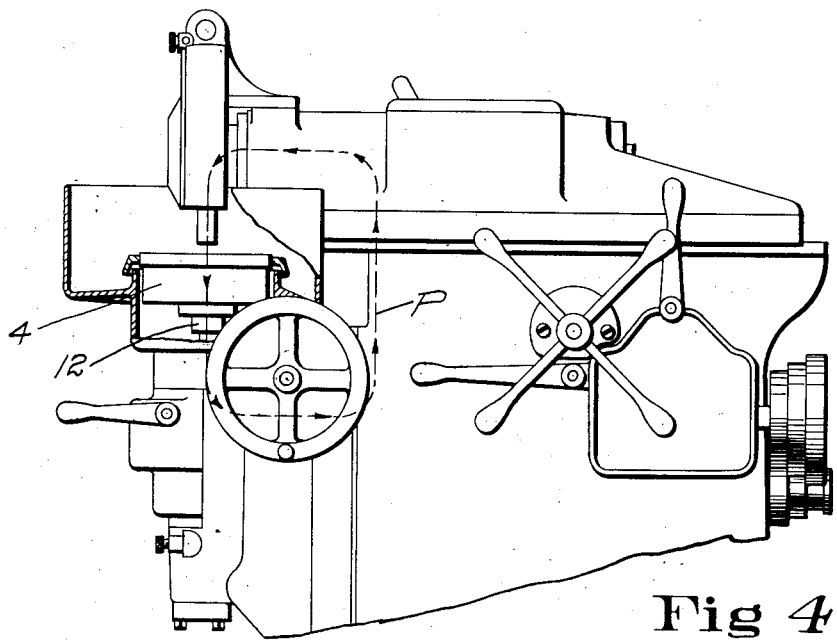
Fig 4
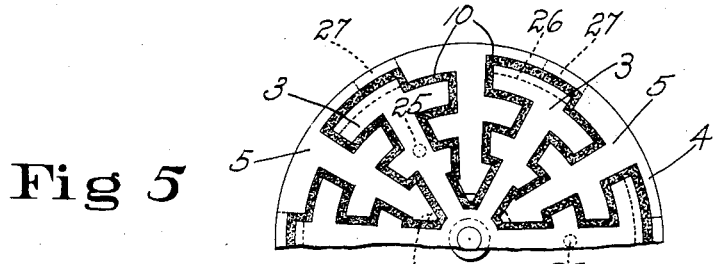
Fig 5
Fig 6
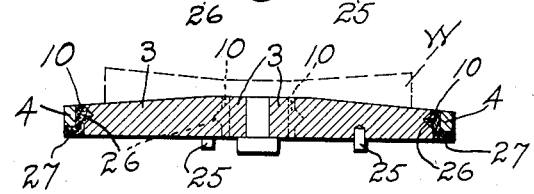
Fig 7
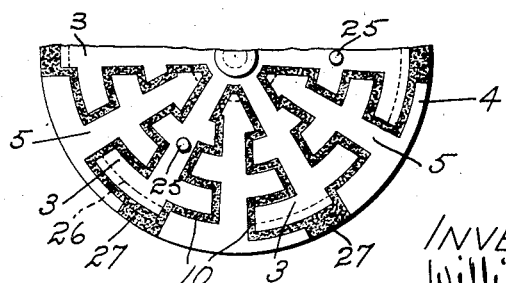
INVENTOR
William Arter
by McDermott and McCready
his attorneys

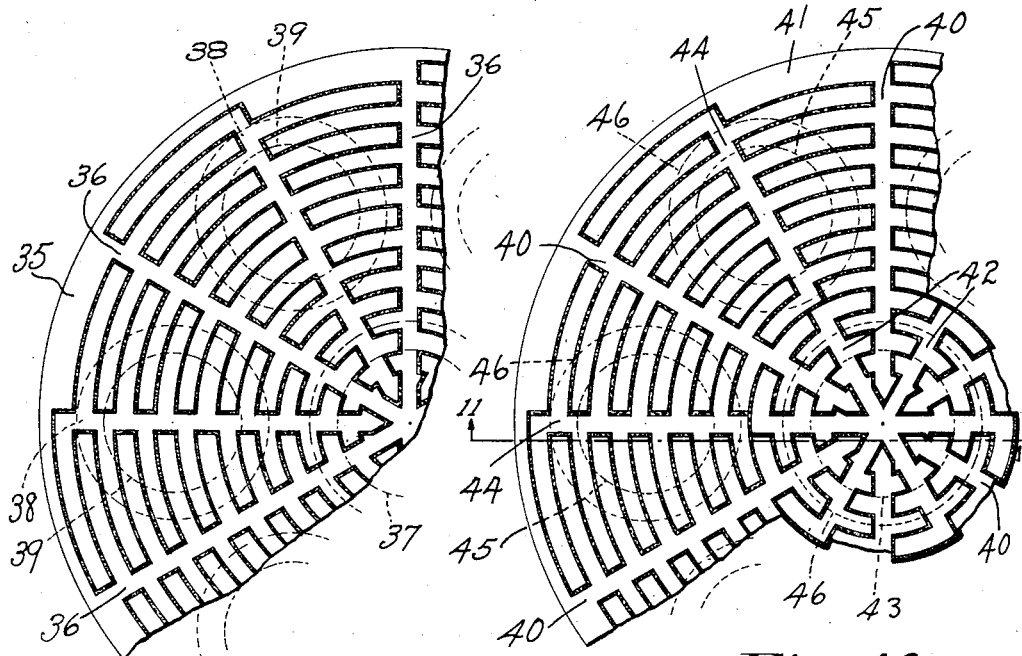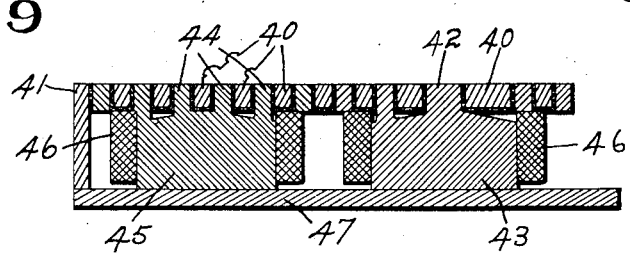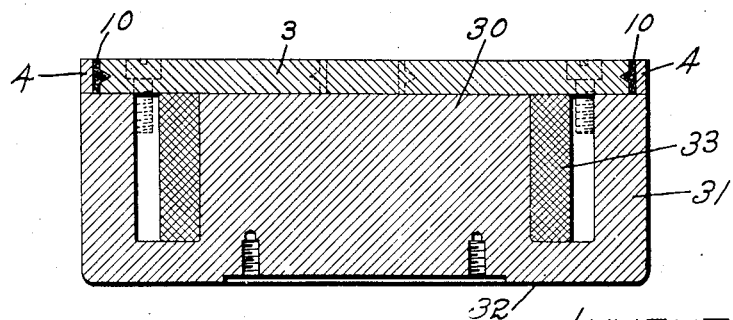

UNITED STATES PATENT OFFICE.

WILLIAM ARTER, OF WORCESTER, MASSACHUSETTS, ASSIGNOR TO THE PERSONS-ARTER MACHINE COMPANY, OF WORCESTER, MASSACHUSETTS, A CORPORATION OF MASSACHUSETTS.

MAGNETIC CHUCK.

1,312,092. Specification of Letters Patent. Patented Aug. 5, 1919.

Continuation in part of application Serial No. 48,018, filed August 30, 1915. This application filed June 28, 1917. Serial No. 177,508.

*To all whom it may concern:*

Be it known that I, WILLIAM ARTER, a subject of the King of Great Britain, residing at Worcester, in the county of Worcester and State of Massachusetts, have invented certain Improvements in Magnetic Chucks, of which the following description in connection with the accompanying drawings, is a specification, like reference characters on the drawings indicating like parts in the several figures.

This invention relates to work supports of the character in which magnetism is employed to hold the work on the support while it is being operated upon by a machine or hand tool. Supports of this character are much used in machine tools, such for instance as lathes, grinding and milling machines, and are usually referred to as magnetic "chucks." For convenience they will be hereinafter referred to by this term.

The present invention aims to devise a magnetic chuck which will hold small pieces of work securely on its face and which will be more efficient than the chucks of this character now on the market. The invention also aims to devise a superior form of work supporting face for magnetic chucks, using the term "face" in the sense of designating the part or parts of the chuck that support the work. It is a further object of the invention to avoid the magnetizing of the machine parts adjacent to the chuck which usually accompanies the use of chucks of this character and which is highly undesirable because it causes metal chips, filings and other foreign matter to adhere to the parts of the machine so magnetized.

The manner in which it is proposed to accomplish these objects will be readily understood and other advantages of the invention will be appreciated from the following description of one embodiment of the invention, reference being made to the accompanying drawings, in which:

Fig. 4 is a side elevation of a grinding machine equipped with the chuck shown in Figs. 1, 2 and 3;

Fig. 5 is a plan view of approximately half of an auxiliary face plate designed to be used with the chuck shown in Fig. 1;

Fig. 6 is a vertical cross sectional view of the face plate shown in Fig. 5;

Fig. 7 is a bottom view of the face plate shown in Figs. 5 and 6;

Fig. 8 is a vertical cross sectional view of a modified form of chuck;

Fig. 9 is a plan view of another modification;

Fig. 10 is a plan view of a still further modification; and

Fig. 11 is a vertical cross sectional view taken on the line 11—11, Fig. 10.

Figure 1:
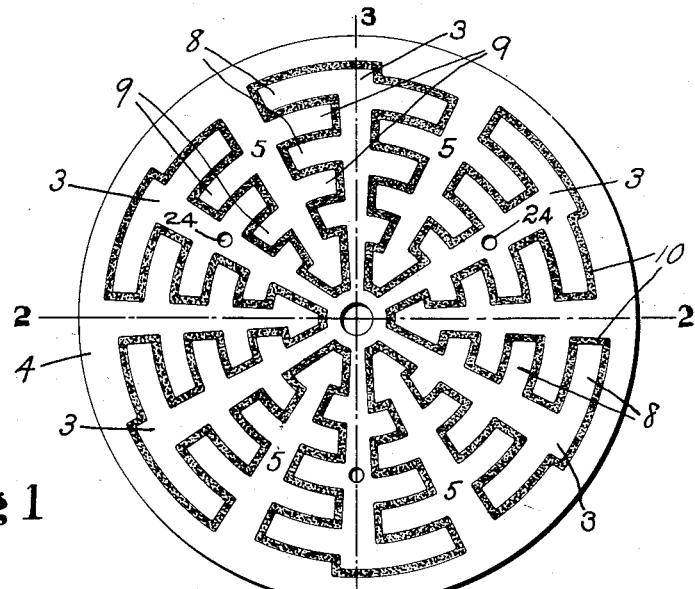
Figure 1 is a plan view of a chuck constructed in accordance with the invention.
Figure 2:
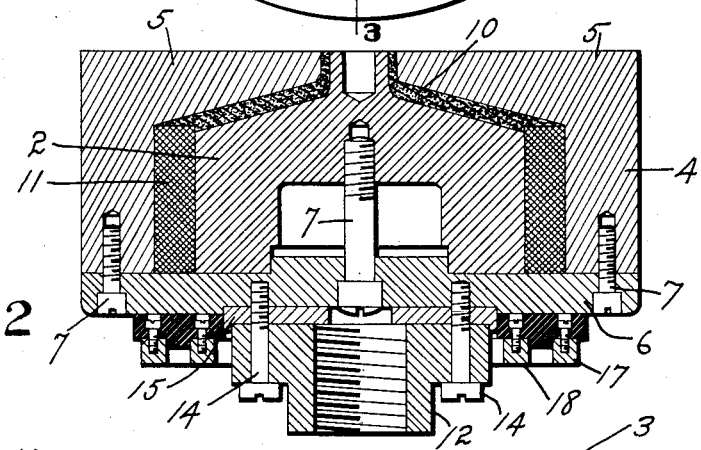
Fig. 2 is a vertical, sectional view on the plane indicated by the line 2—2, Fig. 1.
Figure 3:
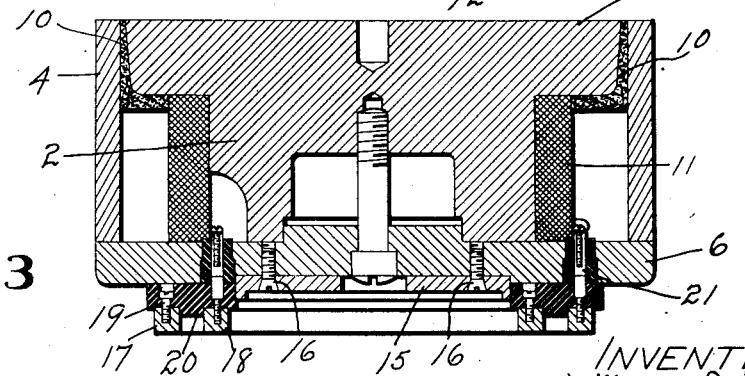
Fig. 3 is a vertical, sectional view on the line 3—3, Fig. 1, certain of the parts shown in Fig. 2 being omitted from Fig. 3.

The chuck shown in Figs. 1, 2 and 3 comprises a central pole piece consisting of a core 2 and a series of arms 3 radiating therefrom, an outer pole piece consisting of a shell 4 having a series of arms 5 which extend therefrom and alternate with the arms 3, and a yoke or base 6 which is rigidly secured to the bottoms of the pole pieces 2 and 4 by screws 7. The yoke and pole pieces are, of course, made of some magnetizable material, such, for instance, as soft iron. A magnetizing coil 11 encircles the core 2 and is positioned between this core and the shell 4. The arms 5 alternate with the arms 3 and extend inwardly toward the center of the chuck so that they overlie the core 2, as clearly shown in Fig. 2. Each of the arms 3 is provided with a plurality of lateral projections 8, the projections on one side of each arm being staggered with relation to those on the other side; and the arms 5 are each provided with corresponding projections 9 which are staggered similarly to the projections 8, see Fig. 1. The projections from adjacent arms are also staggered with reference to each other so that each projection from one arm of either series 3 or 5 extends into a space between similar projections on the next adjacent arm. The two series of arms are so proportioned that they intermesh closely with each other but are separated from each other at all points through the face portion of the chuck by a narrow magnetic gap which is filled with any suitable non-magnetic material, such, for instance, as copper, brass, or more preferably some of the non-magnetic alloys such, for instance, as those commonly known as "white metal alloys". Certain of these alloys expand upon cooling and therefore are particularly useful in a chuck of this character. This material is indicated in the drawings at 10. It will be seen from an inspection of Figs. 2 and 3 that the magnetic gap between the pole pieces which is filled by the metal 10 is narrowest at the face of the chuck and is wider below said face. This construction, of course, tends to cause the lines of force, in bridging the gap between the poles, to concentrate at the face of the chuck where they will be useful in holding the work on the chuck. The peculiar shape of the pole pieces and the provision of a narrow gap between them also is very useful in enabling a relatively small piece of work to bridge so much of the gap in the magnetic circuit as to produce a heavy concentration of lines of force through the work thus holding it securely on the face of the chuck. The provision of arms forming the pole pieces with the concentric projections 8 and 9 extending laterally from them, as shown, is further advantageous since, in building chucks of larger diameter, it is merely necessary to increase the number and length of these concentric projections. The whole working face of the chuck thus is broken up into a great number of very small sections. The yoke is so connected to the two pole pieces that only two gaps or breaks in the magnetic circuit are provided, other than that at the face of the chuck, and these gaps are so located that the abutting parts can be carefully machined and the gaps accordingly reduced to a minimum. The peculiar arrangement of pole pieces also facilitates the manufacture of the chuck, since it permits the non-magnetic material separating the pole pieces to be run uninterruptedly into place forming a single continuous strip, and it also provides a solid foundation for calking to prevent leakage of water into the chuck in case it is used in wet grinding. While it is advantageous, as above indicated, to make the arms or pole tips integral with the core or shell, as the case may be, it is obvious that they may be made in separate pieces while still retaining the advantages produced by the peculiar construction of chuck face. This will be evident from the following description of subsequent figures.

A common mounting for a chuck of this character consists of a support 12 carried by the machine to which the chuck is secured and fastened to the chuck by bolts 14. According to the present invention there is interposed between this support and the chuck, a plate 15 of some non-magnetic material, such, for instance, as brass, copper or fiber, preferably of a thickness greater than the width of the gap between the arms 3 and 5. The bolts 14 also should be made of some non-magnetic material, such as brass or bronze. This plate serves to reduce to a very substantial extent the passage of lines of force into the part 12 and the adjacent parts of the machine, and eliminates the difficulty heretofore experienced with the adherence of metal particles and other foreign matter to the parts of the machine which otherwise would become magnetized. That is, chucks of this construction are often used in machines, such as grinding and milling machines, which are so designed that some part of the machine forms an alternative path for the lines of force set up by the magnetizing coil 11, and thus causes parts of these machines to become magnetized and attract metal chips and filings. Fig. 4 shows the chuck shown in Figs. 1, 2 and 3, mounted in a grinding machine, and it is obvious that the lines of force produced by the manetizing coil 11 would tend to take a path similar to that indicated at P in Fig. 4, particularly if the machine were equipped with a water conducting nozzle which is often used in machines of this character to direct water close to the point of operation of the grinding wheel. The plate 15 insulates (in the sense in which that term is used with reference to the cutting off of magnetic lines of force) the chuck from the part of the machine that supports it, and consequently it obviates the source of annoyance which otherwise would be caused by the stray lines of force entering the adjacent parts of the machine. This plate serves the further function of an adapter plate, enabling the chuck to be mounted readily on different forms of supports by using a plate 15 of appropriate shape. Furthermore, by using plates of different thicknesses, an adjustment of the chuck with reference to its support or the adjacent parts of the machine may readily be made.

Current may be conducted to the coil 11 by means of a pair of brushes bearing, respectively, on slip rings 17 and 18 secured to an insulating ring 19 fastened on the bottom of the yoke 6. Conductors 20 and 21 lead, respectively, from the rings 18 and 17 to the terminals of the coil 11. Insulating bushings encircle these conductors where they pass through the yoke 6.

The surface on which the work is supported may be either the surface of the chuck or the surface of an auxiliary face plate positioned on the face of the chuck and having pole pieces registering with and forming continuations of the pole pieces of the chuck itself. These auxiliary face plates are of particular utility in grinding tapered, hollow, or peculiarly shaped pieces of work, or parts so constructed that only a very small portion of the work would be in contact with the plane face of the chuck, thus making it necessary or desirable to use a chuck face shaped to conform to the surface of the work. Auxiliary face plates may also be used to advantage in grinding work that tends to roughen or injure in any way the face of the chuck, so that it is necessary to re-surface the chuck at relatively frequent intervals. By using an auxiliary face plate under these circumstances, only the face plate is worn out whereas without such an expedient the entire chuck will be rendered useless after a relatively short time.

Figs. 5, 6 and 7 show, respectively, top, cross-sectional and bottom views of an auxiliary face plate designed to be used with the chuck shown in Figs. 1, 2 and 3. It will be seen from inspection of the drawings that while the face plate is smaller in dimensions than the face of the chuck, it has inner and outer pole pieces corresponding to and designed to register with the corresponding pole pieces of the chuck. In order to insure the accurate positioning of the face plate on the chuck, the chuck preferably has three or more holes drilled in it, as indicated at 24, Fig. 1, designed to receive pins 25 projecting from the lower surface of the face plate.

It will be noted that the shell 4 of the outer pole piece completely encircles the central pole piece 3 and that the non-magnetic metal 10 is run into place between the two pole pieces in a continuous strip, as in the chuck shown in Fig. 1. Preferably also the outer ends of the pole pieces 3 and the inner ends of the pole parts 5 are grooved, as indicated at 26, to cause the non-magnetic metal to interlock or be keyed into place between the pole pieces. The non-magnetic material can then be swaged to produce a water tight joint with the pole pieces.

This arrangement provides a particularly sturdy and substantial construction which will stand rough usage without the joints or unions between the parts becoming loose or leaky. Furthermore, since all the parts of each pole are magnetically connected together, it provides a particularly efficient face plate.

It is obvious that since the shell 4 of the outer pole piece completely encircles the inner pole piece, parts of the outer pole piece would magnetically connect opposite pole pieces of the chuck if some special provision were not made to avoid this difficulty. For this purpose the perimeter of the outer pole piece 4 is cut away on its lower face, as indicated at 27, Figs. 5, 6 and 7, and the non-magnetic metal 10 is run into the gaps or cut away places so formed, so that the outer pole piece 4 will bridge the parts of the pole piece 3 of the chuck where it crosses them and will avoid any possibility of magnetically connecting the opposite poles of the chuck itself.

Fig. 6 shows the upper face of the face plate constructed to conform to a concaved piece of work W which the plate is designed to support in position to be ground.

It is obvious that a face plate of this character could be used as the face of a magnetic chuck of the type shown in Fig. 8, in which a core 30 and a shell 31 are made integral with a base 32, a space being provided between the core and the shell to receive the magnetizing coil 33. The face of the chuck shown in this figure is constructed substantially like that shown in Figs. 5, 6 and 7, the only differences being that the face plate shown in Fig. 8 is of uniform thickness and is not provided with the non-magnetic extensions 27. For most purposes, however, I prefer to use a chuck construction of the character shown in Figs. 1, 2 and 3, and to use the device shown in Figs. 5, 6 and 7 merely as an auxiliary face plate.

Figs. 9, 10 and 11 illustrate ways in which the invention may be applied to very large chucks in which a single magnetizing coil would not be sufficient. The construction of the face plate shown in Fig. 9 is very similar indeed to that shown in Fig. 1, but in the arrangement shown in Fig. 9, the outer shell 35 and the arms 36, which correspond respectively to the parts 4 and 5 of Fig. 1, are preferably formed integral with a central core 37. A second series of arms 38, which alternate with the arms 36, are magnetically insulated from each other at the face of the chuck and preferably are each formed integral with a core 39. The arms 36 and 38 are provided with lateral projections arranged in the same manner that the projections 8 and 9 are arranged in Fig. 1 so that the same advantage is produced of breaking up the face of the chuck into a great number of very small pieces and distributing the flow of magnetic lines of force uniformly over the face of the chuck. Each of the cores 39 and the core 37 is encircled by a magnetizing coil which produces the magnetic flux in the pole pieces. In the construction shown in Fig. 9, six cores are arranged about the central core 37 and these cores are supported by a base similar to the base 6 of the construction shown in Figs. 1, 2 and 3.

A somewhat different construction is shown in Figs. 10 and 11. In this arrangement the arms 40 which preferably are integral with the outer shell 41, stop at the central portion of the chuck, and the inner ends of these arms coöperate with another series of arms 42 formed integral with a central core 43, the parts 42 and 43 being constructed exactly as are the parts 2 and 3 in Figs. 1 and 2. Additional arms 44, form in effect, extensions of the arms 42 although they are magnetically independent of the latter arms but of the same polarity as the latter arms. Each of the arms 44 is formed integral with a core 45 and these arms are magnetically independent of each other at the face of the chuck. The six cores 45 in the chuck are arranged in a circular series about the central core 43. A magnetizing coil 46 is provided for each of the cores 43 and 45.

It is obvious that in the arrangement shown in Fig. 9, the core 37, being integral with the arms 36, would have a magnetic flux flowing through it in a direction opposite to the direction of flow of the lines of force in the poles 39, while the direction of the lines of force would be uniform in the cores 43 and 45 of the arrangement shown in Fig. 10.

While I have herein shown and described the best embodiments of the invention of which I am at present aware; it is obvious that the form in which the invention is embodied will vary with the conditions for which the chuck is designed and that the embodiments shown may be modified in minor details without departing from the spirit or scope of the invention. It will be noted that in the arrangements that I have shown for building large chucks, the cores and pole tips in the circular series are all alike, and that the frame is provided with a series of recesses in its work supporting face shaped to receive these pole tips. This arrangement is very convenient from the standpoint of manufacture and is one which may be conveniently followed in making chucks of other forms, such as annular or rectangular chucks. It will be noted that while the pole tips project beyond the outline of the cores with which they coöperate, they are so connected to the core that abundant area is provided for the distribution of the magnetic flux to the extremities of the pole pieces.

This application is a continuation of my pending application, Serial No. 48,018, filed August 30, 1915, for improvements in magnetic chucks in so far as the subject matter common to the two applications is concerned.

What is claimed as new is:

1. In a magnetic chuck, a pole piece comprising a core and a series of arms extending therefrom, a second pole piece comprising a shell lying outside of said core and a series of arms extending from said shell and alternating with the arms of the first mentioned pole piece, a yoke rigid with said core and shell, said yoke and pole pieces being made of magnetizable material, non-magnetic material separating said two series of arms, and a single magnetizing coil encircling said core and positioned between the core and shell, said arms and the material separating them forming the face of the chuck.

2. A magnetic chuck face comprising two series of arms of opposite polarity, the arms of one series alternating with those of the other series and each arm having lateral projections extending therefrom, staggered with relation to each other, and each fitting into a space between similar projections of the next adjacent arm, and narrow strips of non-magnetic material separating said two series of arms.

3. In a magnetic chuck, a central pole piece comprising a core and a series of independent arms radiating therefrom and forming part of the working chuck, an outer pole piece comprising a shell encircling said core and a series of independent arms alternating with the arms of the central pole piece and extending inwardly so that they overlie said core, said two series of arms being separated from each other by a magnetic gap and non-magnetic material filling said gap, a magnetizing coil positioned between said shell and core and encircling the core, and a yoke rigid with said shell and core.

4. A magnetic chuck face comprising a central pole piece and a series of arms radiating therefrom and another pole piece comprising a shell encircling the first pole piece and a series of arms alternating with the arms of the central pole piece and extending inwardly toward said central pole piece, each of said arms having concentric projections extending laterally therefrom, each projection fitting into a space between similar projections extending from the next adjacent arm, and non-magnetic material separating said pole pieces.

5. A magnetic chuck face comprising a central pole piece having a series of arms radiating therefrom and another pole piece comprising a shell encircling the first pole piece and having a series of arms alternating with the arms of the central pole piece and extending inwardly toward said central pole piece, each of said arms having concentric projections extending laterally from its opposite sides, said projections being of substantially uniform width, the projections on opposite sides of each arm being staggered with reference to each other, and each projection fitting into a space between similar projections of the next adjacent arm, and non-magnetic material separating said pole pieces.

6. The combination with a magnetic chuck having two series of arms of opposite polarity, alternating with each other and forming pole pieces, and non-magnetic material separating said pole pieces, of an auxiliary face plate for said chuck, smaller in dimensions than the face of said chuck, and having pole pieces registering with and forming continuations of the pole pieces of said chuck, parts of said face plate being cut away at points on its lower faces where otherwise it would magnetically connect opposite poles of said chuck.

7. A face plate for a magnetic chuck, comprising an inner pole piece, an outer pole piece encircling said inner pole piece, said pole pieces each being provided with a series of arms and the arms of the two series alternating with each other, and non-magnetic material separating said arms and keyed to them, said outer pole piece being constructed to provide a magnetic gap at points where otherwise it would magnetically connect the opposite pole pieces of the chuck on which it is to be used.

8. A face plate for a magnetic chuck, comprising an inner pole piece, an outer pole piece encircling said inner pole piece, said pole pieces each being provided with a series of arms and the arms of the two series alternating with each other, and a continuous strip of non-magnetic material separating said pole pieces.

9. A face plate for a magnetic chuck, comprising an inner pole piece, an outer pole piece encircling said inner pole piece, said pole pieces each being provided with a series of arms and the arms of the two series alternating with each other, and a continuous strip of magnetic material separating said pole pieces and keyed to them, all the parts of each of said pole pieces being magnetically connected together.

10. A magnetic chuck having a series of arms radiating from a center and projections extending laterally from said arms, a second series of arms extending inwardly from the perimeter of the chuck alternating with the arms of the first series and provided with lateral projections lying between the projections of the next adjacent arms, the two series of arms and their projections forming pole pieces of opposite polarity, non-magnetic material separating said pole pieces, and a series of cores and magnetizing coils therefor arranged about said center and coöperating with said pole pieces to create a magnetic flux in them.

11. A magnetic chuck having a series of arms radiating from a center and projections extending laterally from said arms, a second series of arms extending inwardly from the perimeter of the chuck alternating with the arms of the first series and provided with lateral projections lying between the projections of the next adjacent arms, the two series of arms and their projections forming pole pieces of opposite polarity, non-magnetic material separating said pole pieces, a core for each arm of one of said series, and a magnetizing coil for each of said cores.

12. A magnetic chuck having a series of arms radiating from a center and projections extending laterally from said arms, a second series of arms extending inwardly from the perimeter of the chuck alternating with the arms of the first series and provided with lateral projections lying between the projections of the next adjacent arms, the two series of arms and their projections forming pole pieces of opposite polarity, non-magnetic material separating said pole pieces, a central core, a series of cores arranged about said central core, and magnetizing coils for said cores, said coils and cores coöperating with said pole pieces to produce a magnetic flux in them.

13. The combination with a support 12, of a magnetic chuck mounted on said support, said chuck having a work supporting face comprising pole pieces of opposite polarity, and non-magnetic material separating said pole pieces, a non-magnetic plate interposed between said support and said chuck, and means for removably securing said support, chuck and plate together.

14. The combination of a machine, a magnetic chuck supported by said machine to hold the work on which the machine operates, and means for magnetically insulating the chuck from the part of the machine that supports it.

15. A magnetic chuck having a series of arms radiating from the central portion thereof and projections extending laterally from said arms, a second series of arms alternating with the arms of the first series and provided with lateral projections lying between projections of the next adjacent arm, the two series of arms and their projections forming pole pieces of opposite polarity, non-magnetic material separating said pole pieces and means for producing a magnetic flux in said pole pieces, the arms of one of said series being magnetically independent of each other at the face of the chuck.

16. A magnetic chuck having a work holding face comprising a series of arms radiating from a center and projections extending laterally from said arms, a second series of arms extending inwardly from the perimeter of the chuck alternating with the arms of the first series and provided with lateral projections lying between the projections of the next adjacent arms, the two series of arms and their projections forming pole members of opposite polarities, and non-magnetic material separating said pole pieces.

In testimony whereof I have signed my name to this specification.

WILLIAM ARTER.

Correction in Letters Patent No. 1,312,092.

It is hereby certified that in Letters Patent No. 1,312,092, granted August 5, 1919, upon the application of William Arter, of Worcester, Massachusetts, for an improvement in "Magnetic Chucks," an error appears in the printed specification requiring correction as follows: Page 4, line 74, claim 3, insert the words *face of the;* and that the said Letters Patent should be read with this correction therein that the same may conform to the record of the case in the Patent Office.

Signed and sealed this 26th day of August, A. D., 1919.

[SEAL.]

M. H. COULSTON,
*Acting Commissioner of Patents.*

Cl. 175—367.